United States Patent [19]

Schulz

[11] Patent Number: 4,821,796
[45] Date of Patent: Apr. 18, 1989

[54] DEVICE FOR HEATING COMPARTMENTS

[75] Inventor: Joachim Schulz, Amorbach, Fed. Rep. of Germany

[73] Assignee: Aurora Konrad G. Schulz GmbH & Co., Mudau/Odenwald, Fed. Rep. of Germany

[21] Appl. No.: 206,956

[22] Filed: Jun. 9, 1988

Related U.S. Application Data

[63] Continuation of Ser. No. 811,494, Dec. 20, 1985, abandoned.

[30] Foreign Application Priority Data

Jan. 17, 1985 [DE] Fed. Rep. of Germany ....... 3501451

[51] Int. Cl.[4] .............................................. F24H 3/06
[52] U.S. Cl. ..................................... 165/122; 165/42; 180/68.4
[58] Field of Search ............................. 180/68.1, 68.4; 165/124, 126, 127, 41, 42, 122

[56] References Cited

U.S. PATENT DOCUMENTS

| | | | |
|---|---|---|---|
| 2,066,817 | 1/1937 | Young | 165/127 X |
| 2,158,258 | 5/1939 | Tucharski et al. | 165/127 |
| 2,169,109 | 8/1939 | Müller | 165/12 X |
| 2,247,987 | 7/1941 | Carson | 165/126 X |
| 2,667,336 | 1/1954 | Lehane et al. | 165/42 X |
| 2,746,726 | 5/1956 | Hoff | 165/127 X |
| 2,894,728 | 7/1959 | Davis | 165/126 X |
| 3,008,694 | 11/1961 | Todd | 165/42 |
| 3,394,755 | 7/1968 | Morrison | 165/126 X |
| 4,384,673 | 5/1983 | Carson | 165/126 X |
| 4,470,271 | 7/1984 | Draper et al. | 165/126 X |

Primary Examiner—Ira S. Lazarus
Assistant Examiner—Peggy Neil
Attorney, Agent, or Firm—Becker & Becker

[57] ABSTRACT

A device for heating passenger compartments. A fan and a heat exchanger are provided in a housing. To achieve a compact construction and a greater air capacity, the fan is a radial-flow fan having a rectangular air outlet opening. The heat exchanger is disposed at one of the end faces of the fan, and the air inlet side of the heat exchanger is disposed at an angle to the axis of the fan. At least one air-guiding member is provided between the delivery conduit of the fan and the inlet side of the heat exchanger. The air-guiding member changes the flow of air emerging from the opening of the fan into an approximately right-angled or rectangular flow profile having a width corresponding to the width of the heat exchanger, with the flow striking the inlet side of the heat exchanger at an acute angle.

18 Claims, 2 Drawing Sheets

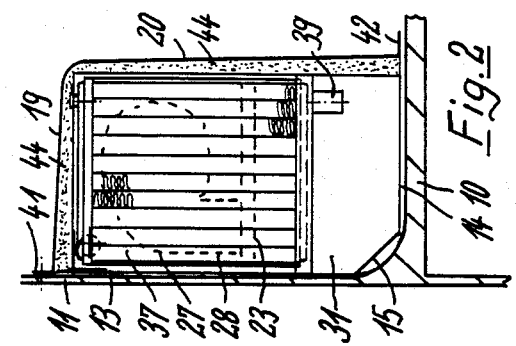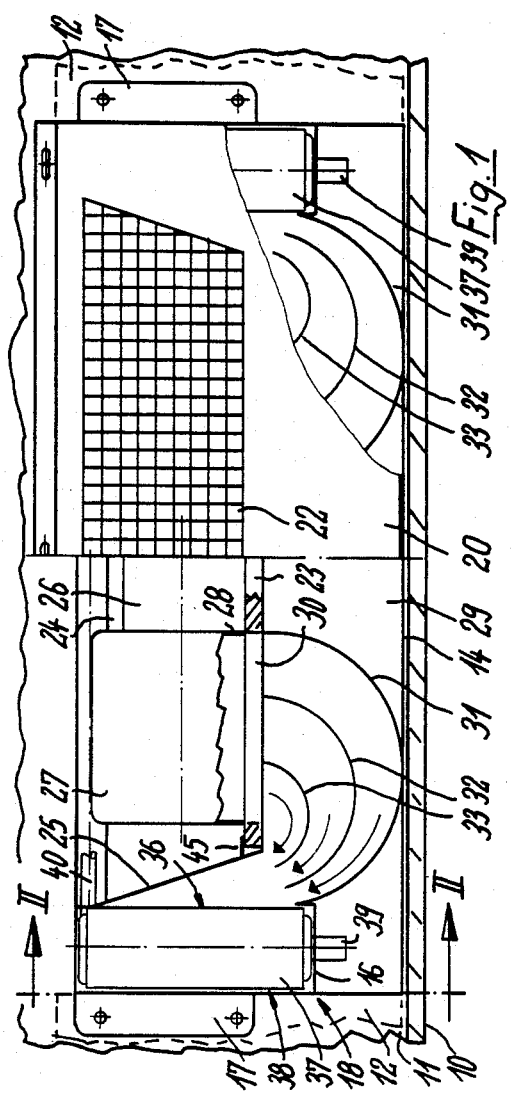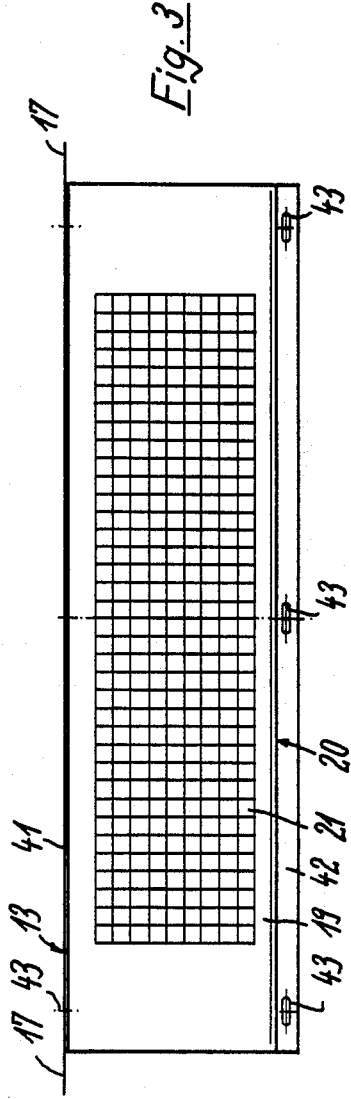

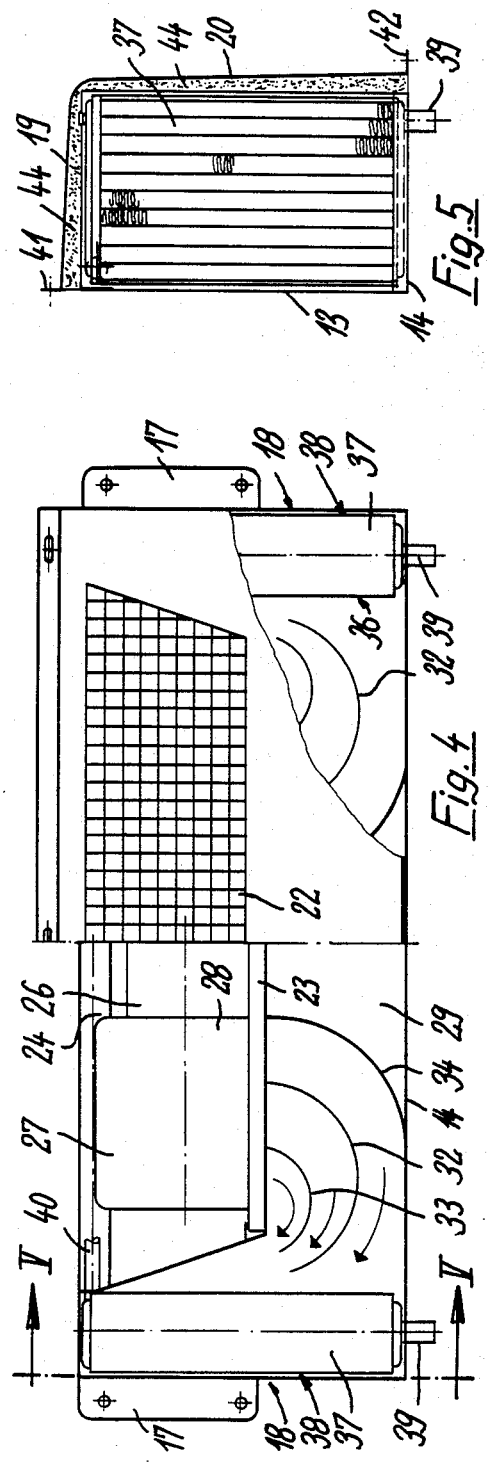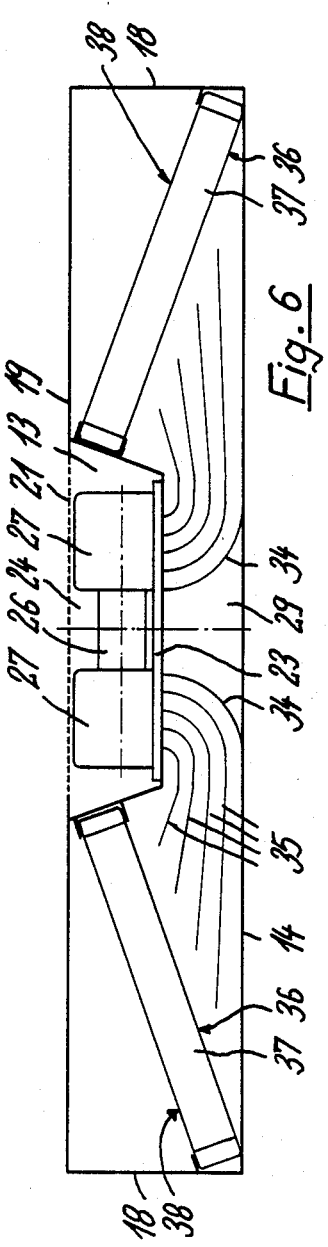

DEVICE FOR HEATING COMPARTMENTS

This application is a continuation, of application Ser. No. 811,494 filed Dec. 20, 1985 now abandoned.

BACKGROUND OF THE INVENTION

1. Field of the Invention

The present invention relates to a device for heating passenger compartments or the like, especially in buses. The device includes a housing that has air inlet openings and air outlet openings and that accommodates a heat exchanger and a fan. The opening of the delivery conduit of the fan is offset relative to the inlet side of the heat exchanger, which is disposed downstream of the fan.

2. Description of the Prior Art

With a known device of this general type, the housing has air inlet openings in the vicinity of the drive motor, air flows axially through a fan wheel, the inlet side of the heat exchanger is disposed parallel to the plane of rotation of the fan wheel, and the end face of the housing is provided with air outlet openings. In addition to the fact that the axial fan has a relatively low efficiency, as a result of which the fan wheels have to be appropriately larger, dead corners result on the inlet side of the heat exchanger; it is not possible to assure that these corners are uniformly filled, and the airstream furthermore swirls greatly in these corners. The in-flow velocity at the air inlet openings is fairly high, so that the heretofore known device is not suitable for use, for example, in the floor region of the passenger area of a bus, since too much dust and debris would be drawn from the floor and into circulation with the air flow. This leads to premature fouling or clogging of the fan and the heat exchanger. In addition, there is the danger of a short circuit in the air flow between the air inlet and air outlet openings of the housing; this could lead to overheating and damage to the device.

Therefore, an object of the present invention is to design a device of the aforementioned general type in such a way that there can be achieved a great air capacity accompanied by a compact construction and little development of noise.

BRIEF DESCRIPTION OF THE DRAWINGS

This object, and other objects and advantages of the present invention, will appear more clearly from the following specification in conjunction with the accompanying drawings, in which:

FIG. 1 is a partially sectioned side view of one inventive embodiment of the device in the form of a double system;

FIG. 2 is a view in cross section taken along the line II—II in FIG. 1;

FIG. 3 is a plan view of the device of FIG. 1;

FIG. 4 is a partially sectioned side view of a further inventive embodiment of the device;

FIG. 5 is a view in cross section taken along the line V—V in FIG. 4; and

FIG. 6 is a very schematic side view of a further embodiment of the inventive device.

SUMMARY OF THE INVENTION

The device of the present invention comprises: a housing having an air inlet opening and an air outlet opening; a radial-flow fan accommodated in the housing and having an axis and end faces; a delivery conduit connected to the fan for receiving air therefrom, with the delivery conduit having a rectangular air outlet opening with long sides that are parallel to the axis of the fan; a heat exchanger accompanied in the housing and having an air inlet side for receiving air from the opening of the delivery conduit, with this outlet opening of the conduit being offset relative to the inlet side of the heat exchanger, and with the heat exchanger being disposed in the vicinity of at least one of the end faces of the fan, whereby the air inlet side of the heat exchanger is disposed at an angle to the axis of the fan; and at least one air-guiding member disposed between the delivery conduit and the air inlet side of the heat exchanger, with the air-guiding member guiding and changing the flow of air emerging from the air outlet opening of the delivery conduit in such a way that this flow has an approximately right-angled flow profile, has a width corresponding to the width of the heat exchanger, and strikes the air inlet side of the heat exchanger at an acute angle.

With the present invention there is thus provided a compact device which, for example, can be installed directly in a duct that extends along the floor and next to the walls of the passenger space of a bus. The housing of the device can be integrated completely in the duct passage, with return air being drawn through the air inlet openings and being blown into the duct after passing through the heat exchanger in the axial direction. The in-flow speed of the return air at the air inlet openings is less than with devices having axial fans. The air inlet openings can be relatively large, and are spaced from the floor of the passenger space since the radial-flow fan is disposed above the area where the direction of the airstream is effected, so that also for this reason there does not exist the danger that dust and debris can be drawn in from the floor, so that the fan and the heat exchanger do not become contaminated. The airstream that exits the opening of the fan, and has an approximately right-angled flow profile, has its direction changed by the air-guiding member or members in such a way that the airstream to a large extent uniformly strikes the entire surface of the inlet side of the heat exchanger in a loss-free manner. Despite the distinct change in direction, the bending of the airstream is effected uniformly and furthermore in such a way that no additional noise is generated; the device thus operates in a relatively noiseless manner. Swirling of the airstream, and especially the formation of secondary swirls, is avoided by the use of a plurality of air-guiding members.

Since the heat exchanger is disposed downstream of the fan when viewed in the axial direction of the latter, the inventive device is compact and in particular has a small cross-sectional area. The total cross-sectional area of the device can correspond to that of the air outlet opening and possibly even that of the associated duct. This is particularly advantageous when the device is a double system and can blow air into associated duct sections from both end faces. For this purpose, two coaxially disposed fans are provided and driven from a single centrally disposed electric motor. The airguiding members are directed symmetrically outwardly, with a respective heat exchanger being disposed at the free end face of each fan.

Further advantageous features of the present invention will be described subsequently.

DESCRIPTION OF PREFERRED EMBODIMENTS

Referring now to the drawings in detail, Figures 1 and 2 show a floor 10 and a side wall 11 of the passenger area of a bus. A channel or duct 12 extends along the side wall 11 directly above the floor 10. The duct 12 serves for the uniform distribution of warmed-up return air, with the duct 12 being provided with non-illustrated air outlet vents.

In the embodiment illustrated in FIGS. 1 to 3, the device is embodied as a double system and is provided with a two-part housing. A bottom part of the housing includes a rear wall 13 and a base 14. An inclined wall portion 15 is preferably disposed between the rear wall 13 and the base 14. This inclined wall portion 15 is intended for spanning rounded portions, reinforcements, etc. located in the corner between the floor 10 and the side wall 11 of the passenger area. The rear wall 13 is provided with brackets or supports 16 for a heat exchanger, and with brackets or tabs 17 that have holes for attaching the bottom part of the housing to the side wall 11. In addition, each of the end faces of the bottom part of the housing includes an air outlet opening 18 that is provided with non-illustrated connection or bridging elements that leads to the duct 12.

Associated with the bottom part is a top or cover formed by a top 19 and a side 20. The top 19 is provided with a central air inlet opening 21, and the side 20 is provided with a similar air inlet opening 22 that, as shown in FIG. 1, is disposed at a distance from the floor 10 of the passenger area.

Provided within the housing is a partition 23 that extends over the entire width of the housing and is sealed off relative to the rear wall 13 and the side 20. Thus, together with the rear wall 13, the top 19, and the side 20, the partition 23 forms an intake chamber 24, the end faces of which are closed off by partitions 25. These partitions 25 are spaced from the air intake openings 18 and extend at an angle relative to the latter. Disposed approximately in the center of the intake chamber 24 is an electric motor 26 that drives two cross-current fans 27. Each of the fans 27 is provided with a delivery conduit 28 that leads to the partition 23 and is sealed off relative to the latter. Within the partition 23, each delivery conduit 28 is provided with a rectangular opening 30 which in the illustrated embodiment is directed toward the floor 10 of the passenger area. The size and positioning of the air inlet opening 22 are such that this opening, as shown in FIG. 1, starts directly above the partition 23 and extends at most to the inclined partitions 25. This assures that the return air enters only the intake chamber 24.

Disposed below the partition 23 is a chamber 29 that accommodates air-guiding members 31, 32, and 33. The parallel longitudinal sides of the rectangular opening 30 extend parallel to the axis of the fan 27, whereas the end edges of the flat-topped air-guiding members 31, 32, 33 extend parallel to the narrow sides of the rectangular opening 30. In the embodiment illustrated in FIG. 1, the air-guiding members 31, 32, 33 are helically curved and extend over an angle of approximately 170°. The direction of the airstreams is indicated by arrows.

A heat exchanger 37 is disposed at the free end face of the fan 27. The inlet side 36 of the heat exchanger 37 is oriented at right angles to the axis of the fan 27.

In the embodiment of FIG. 6, two heat exchangers 37 are shown each disposed at an obtuse angle of approximately 160° to the axis of the double fan 27. An air-guiding member 34 extends only to the base 14 of the housing, whereas further airguiding members 35 are embodied and disposed as shown in FIG. 6. The thus-formed channels initially taper in the manner of nozzles, and subsequently widen in order to achieve a flow that is as energetic as possible, and which is then directed toward the inlet sides 36 of the heat exchangers 37. The enlarged heat exchangers 37 of the embodiment of FIG. 6 provide a greater thermal capacity. Also, with this embodiment, the flow strikes the entire width and height of the heat exchanger with a flat rectangular flow profile at an acute angle.

The air-guiding members 31–35 are expediently made of thin sheet steel, and can be separately manufactured as a unit that can be inserted into the housing. The air-guiding members are advantageously secured to the partition 23. The unit could also be made of plastic, thus providing the further possibility of making the air-guiding members aerodynamic.

In the embodiment pursuant to FIGS. 1 to 3, if flow is initially downward toward the floor 10 and is subsequently again directly upwardly toward the inlet side 36 of the heat exchanger 37, an acceleration is already effected after the opening 30, when viewed in the direction of flow, with guiding being brought about and enhanced by having the inclined wall portion 15 increasingly narrow the individual channels.

In the embodiment of FIGS. 4 and 5, the outlet sides 38 of the heat exchangers 37 correspond exactly to the cross-sectional area of the air outlet openings 18, so that an optimum thermal capacity is provided by a relatively compact device. Also, with this embodiment, one air-guiding member 34 leads only to the base 14. In the region inwardly of the air-guiding member 34, the flow is guided by air-guiding members 32 and 33.

In the double system of the embodiments of FIGS. 1 to 3 or 4, 5, each heat exchanger is provided with only a single water connection 39. Both heat exchangers are connected in series by a line 40 that extends parallel to the rear wall 13.

However, it is also possible to subdivide the lower collector of the heat exchanger 37 via a partition, whereas the upper collector is continuous. The two lower collector sections are then respectively provided with a water feed and a water discharge.

When the device is assembled, the rear wall 13 of the bottom portion of the housing is first attached to the side wall 11 of the vehicle. The top part of the housing is subsequently installed, whereby the top 19 can be provided with an angled flange 41, and the side 20 can be provided with an angled flange 42. The flanges 41 and 42 are expediently provided with slotted holes 43 or the like to enable the top part of the housing to be attached to the side wall 11 and the floor 10 respectively. In this manner, the device is held in position.

The inwardly directed surfaces of the top 19 and of the side 20 can be coated with soft foam material 44 that is advantageously open-poured and self-extinguishing. The material 44 furthermore should be self-sealing. The foam material coating 44 has the advantage that it assures a satisfactory sealing in the region of the free edges of the partition 23, the partitions 25, and the air-guiding members 31 to 35, and at the same time separates the intake chamber 24 from the pressure chambers.

The partition 23, along with the fans 27 connected thereto, can be in the form of a slide-in unit that is disposed in guides 45 provided on the free ends of the partitions 25. These partitions 25 are then advantageously rigidly connected to the rear wall 13.

The present invention is, of course, in no way restricted to the specific disclosure of the specification and drawings, but also encompasses any modifications within the scope of the appended claims.

What I claim is:

1. A device for installation to heat a vehicular passenger compartment in vehicles including particularly buses having a duct along a side wall directly above a floor thereof for distribution of air and having an improvement in combination therewith comprising:

a housing for receiving a heat exchanger means having a width and a fan means having a main longitudinal axis as well as having air inlet opening means and air outlet opening means; said fan means and the air outlet opening means extending longitudinally of said housing relative to which said fan means is installed in a space-saving manner; said housing further including an air guide means arranged between an air outlet opening of said fan means and an air inlet side of said heat exchanger means; said air guide means including at least one air guide element for changing flow of air emerging from said fan means so that said flow of air has an approximately rectangular flow profile and a width corresponding to the width of said heat exchanger means said fan means being a radial-flow fan means including end faces and including an extension of the air outlet opening thereof parallel to the main longitudinal axis of said fan means; said heat exchanger means having a plane of the air inlet side thereof disposed at a fixed position with respect to the main longitudinal axis of said fan means, said fixed position thereof forming an angle to said main longitudinal axis of said fan means; said fan means receiving air from said air inlet opening means;

delivery conduit means connected to said fan means, downstream of said air inlet opening means, for receiving air from said fan means; said delivery conduit means having an air outlet opening located in a plane extending parallel to said main longitudinal axis of said fan means;

heat exchanger means installed transversely as accommodated in said housing and having an air inlet side thereof for receiving air from said air outlet opening of said delivery conduit means through said heat exchanger means, said air outlet opening of said delivery conduit means being offset relative to said air inlet side of said heat exchanger means; said heat exchanger means being disposed in the vicinity of at least one of said end faces of said fan means, with said air inlet side of said heat exchanger means being disposed at an angle to said main longitudinal axis of said fan means; said heat exchanger means also having an air outlet side, with said air outlet opening means of said housing receiving air from said air outlet side of said heat exchanger means; and means for separation of air flow including said airguiding element with said airguiding means extending over the entire width of said housing as disposed between said air outlet opening of said delivery conduit means, and said air inlet side of said heat exchanger means; said air-guiding element guides and changes the flow of air emerging from said air outlet opening of said delivery conduit means in such a way that said air flow has an approximately rectangular flow profile, has a width corresponding to the width of said heat exchanger means, and strikes said air inlet side of said heat exchanger means at an angle, said air guide element having different sides therewith and having air flowing on both sides thereof as well as having a tapered area therewith arranged downstream of said delivery conduit means and upstream of said air inlet side of said heat exchanger means, for supplying air to said heat exchanger means in a downstream expanding and increasing manner substantially free of any intermixing thus avoiding turbulence of air flow therethrough due to reduction of flow resistance, said heat exchanger means having air flow therethrough passing generally perpendicularly to the air inlet side thereof so that air flow occurs substantially free of losses and free of noise in spite of deflection and deformation of the air flow.

2. A device in combination according to claim 1, in which said air inlet side of said heat exchanger means is disposed at a right angle to said axis of said fan means.

3. A device in combination according to claim 1, in which said air outlet opening of said delivery conduit means has rectangular configuration with long and short sides; and which includes a first one of said air-guiding members, with said first airguiding member being curved and connected to one of said short sides of said air outlet opening that is remote from said heat exchanger means.

4. A device in combination according to claim 3, which includes further air-guiding members disposed in a region between said first air-guiding member and said heat exchanger means.

5. A device in combination according to claim 4, in which said air-guiding members have the same width as said heat exchanger means.

6. A device in combination according to claim 4, in which said air-guiding members are thin-walled elements.

7. A device in combination according to claim 4, in which said air-guiding members are at least partially curved.

8. A device in combination according to claim 4, which includes a total of three air-guiding members disposed next to one another and forming channels that taper in a nozzle-like fashion; and in which the crosssectional area of air flow increases prior to striking said air inlet side of said heat exchanger means.

9. A device in combination according to claim 8, in which said channels formed by said air-guiding members widen, remote from said air outlet opening of said delivery conduit means, to effect said increase of said cross-sectional air of air flow.

10. A device in combination according to claim 4, which includes a partition connected to said housing and having a width conforming to that of said air-guiding members; said air outlet opening of said delivery conduit means is disposed in said partition.

11. A device in combination according to claim 10, in which said partition delimits an intake chamber within said housing, with said intake chamber being separated from said air-guiding members and said heat exchanger means, and serving to accommodate said fan means and a motor for driving the latter; said intake chamber communicates with said air inlet opening means of said housing, and filter material provided with said intake chamber.

12. A device in combination according to claim 4, in which said radial-flow fan means is embodied as a cross-current fan.

13. A device in combination according to claim 4, in which said fan means comprises two coaxial fans; which includes a single, centrally disposed motor for driving said fans; in which said air-guiding members are symmetrically outwardly directed; in which said heat exchanger means comprises two heat exchangers, one disposed at each of those end faces of said fans that are remote from one another; and in which said air inlet opening means of said housing are provided in the vicinity of said drive motor.

14. A device in combination according to claim 1, for use in a vehicle having a warm-air delivery mechanism with which said air outlet means of said housing communicates; and in which said air outlet side of said heat exchanger means is disposed in said air outlet opening means of said housing.

15. A device in combination according to claim 1, in which said housing includes a cover part having a side that faces said vehicular passenger compartment, with said side being provided with a foam-material coating.

16. A device in combination according to claim 15, in which said cover part of said housing also includes a top that faces said vehicular passenger compartment and is provided with a foam-material coating.

17. A device for installation to heat a vehicular passenger compartment in vehicles including particularly buses having a duct along a side wall directly above a floor thereof for distribution of air and having an improvement in combination therewith comprising:
   a housing for receiving a heat exchanger means and a fan means having a main longitudinal axis as well as having air inlet opening means and air outlet opening means;
   said fan means and the air outlet opening means extending longitudinally of said housing relative to which said fan means is installed in a space-saving manner;
   said housing further including an air guide means arranged between an air outlet opening of said fan means and an air inlet side of said heat exchanger means;
   said air guide means comprising at least one air guide element for changing flow of air emerging from said fan means in such a way that said air flow has an approximately rectangular flow profile and a width corresponding to the width of said heat exchanger means;
   said fan means being a radial-flow fan means including end faces;
   delivery conduit means connected to said fan means, downstream of said air inlet opening means, having an air outlet opening having a plane extending parallel to said main longitudinal axis of said fan means
   said heat exchanger means having a plane of said air inlet side thereof disposed at a fixed position with respect to said main longitudinal axis of said fan means for receiving air from said air outlet opening of said delivery conduit means through said heat exchanger means, said fixed position thereof forming an angle to said main longitudinal axis of said fan means, said air inlet side of said heat exchanger means being offset relative to said air outlet opening of said delivery conduit means, said heat exchanger means being disposed in the vicinity of at least one of said end faces of said fan means;
   said air guide means extending over the entire width of said housing as disposed between said air outlet opening of said delivery conduit means and said air inlet side of said heat exchanger means, and
   means for separation of air flow including said air guide element with said airguiding means as well as having different sides thereof for guiding and changing the flow of air emerging from said air outlet opening of said delivery conduit means;
   said air flow flowing on both sides of said air guide element which generally is partially helically formed and is tapers in a nozzle-like fashion;
   said air guide means having a tapered area arranged downstream of said air-guiding member and upstream of said air inlet side of said heat exchanger means, for supplying air to said heat exchanger means in a downstream expanding and increasing manner substantially free of any intermixing thus avoiding turbulence of air flow therethrough due to reduction of flow resistance; and
   said heat exchanger means having an air flow therethrough being generally perpendicularly to the air inlet side thereof so that air flow occurs substantially free of losses and free of noise in spite of deflection and deformation of the air flow.

18. A device for installation to heat a vehicular passenger compartment in vehicles including particularly buses having a duct along a side wall directly above a floor thereof for distribution of air and having an improvement in combination therewith comprising:
   a housing for receiving a heat exchanger means having a width and a fan means having a main longitudinal axis as well as having air inlet opening means and air outlet opening means; said fan means and the air outlet opening means extending longitudinally of said housing relative to which said fan means is installed in a space-saving manner; said housing further including an air guide means arranged between an air outlet opening of said fan means and an air inlet side of said heat exchanger means; said air guide means including several air guide elements for changing flow of air emerging from said fan means so that said flow of air has an approximately rectangular flow profile and a width corresponding to the width of said heat exchanger means;
   said fan means being a radial-flow fan means including end faces and including an extension of the air outlet opening thereof parallel to the main longitudinal axis of said fan means; said heat exchanger means having a plane of the air inlet side thereof disposed at a fixed position with respect to the main longitudinal axis of said fan means, said fixed position thereof forming an angle to said main longitudinal axis of said fan means; said fan means receiving air from said air inlet opening means;
   delivery conduit means connected to said fan means, downstream of said air inlet opening means, for receiving air from said fan means; said delivery conduit means having an air outlet opening located in a plane extending parallel to said main longitudinal axis of said fan means;
   heat exchanger means installed transversely as accommodated in said housing and having an air inlet side thereof for receiving air from said air outlet opening of said delivery conduit means through said heat exchanger means, said air outlet opening of said conduit means being offset relative to said air inlet side of said heat exchanger means; said heat exchanger means being disposed in the vicinity of at least one of said end faces of said fan means, with said air inlet side of said heat exchanger means being disposed at an angle to said main longitudinal axis of said fan means; said heat exchanger means also having an air outlet side, with said air outlet opening means of said housing receiving air from said air outlet side of said heat exchanger means; and means for separation of air flow including said several air-guiding elements of said air-guiding means extending over the entire width of said housing as disposed between said air outlet opening of said delivery conduit means, and said air inlet side of said heat exchanger means; said several air-guiding elements guide and change the flow of air emerging from said air outlet opening of said delivery conduit means in such a way that said air flow has an approximately rectangular flow profile, has a width corresponding to the width of said heat exchanger means, and strikes said air inlet side of said heat exchanger means at an angle, said several air-guiding elements having different sides therewith and having air flowing on both sides thereof as well as having a tapered area therewith arranged downstream of said several air-guiding elements and upstream of said air inlet side of said heat exchanger means, for supplying air to said heat exchanger means in a downstream expanding and increasing manner substantially free of any intermixing thus avoiding turbulence of air flow therethrough due to reduction of flow resistance so that air flow occurs substantially free of losses and free of noise in spite of deflection and deformation of the air flow; said heat exchanger means having air flow therethrough passing generally perpendicularly to the air inlet side thereof;

said air outlet opening of said delivery conduit means also having short sides; a first one of said several air-guiding elements being curved and being connected to that one of said short sides of said air outlet opening that is remote from said heat exchanger means; and further ones of said several air-guiding elements being disposed in the region between said first one of said several air-guiding elements and said heat exchanger means.

* * * * *